Oct. 22, 1940.  R. O. ANDERSON  2,219,215
HYDRAULIC BRAKING APPARATUS
Filed April 11, 1938  7 Sheets-Sheet 2
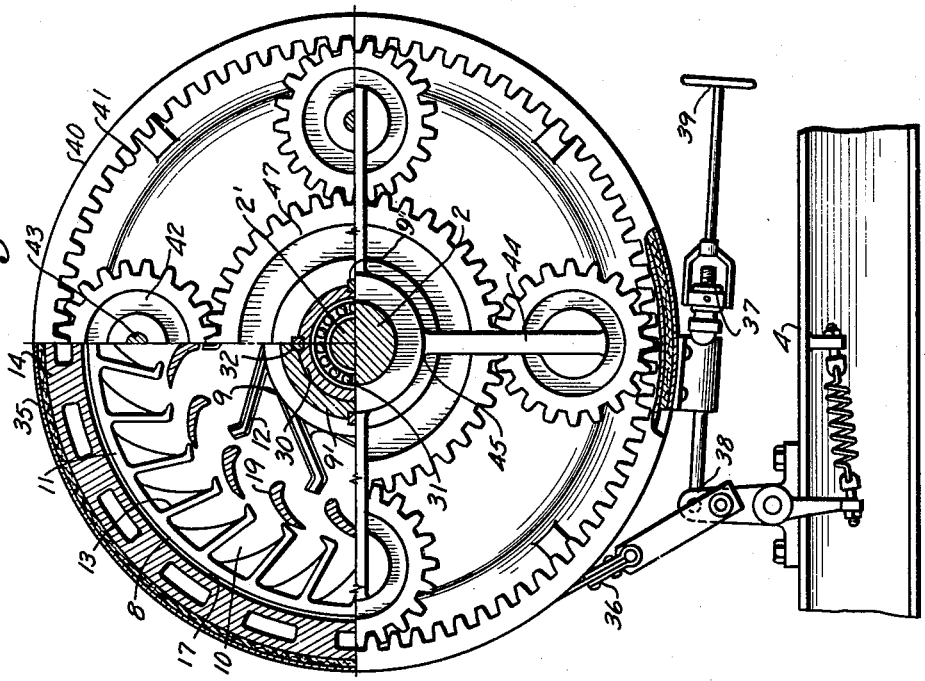
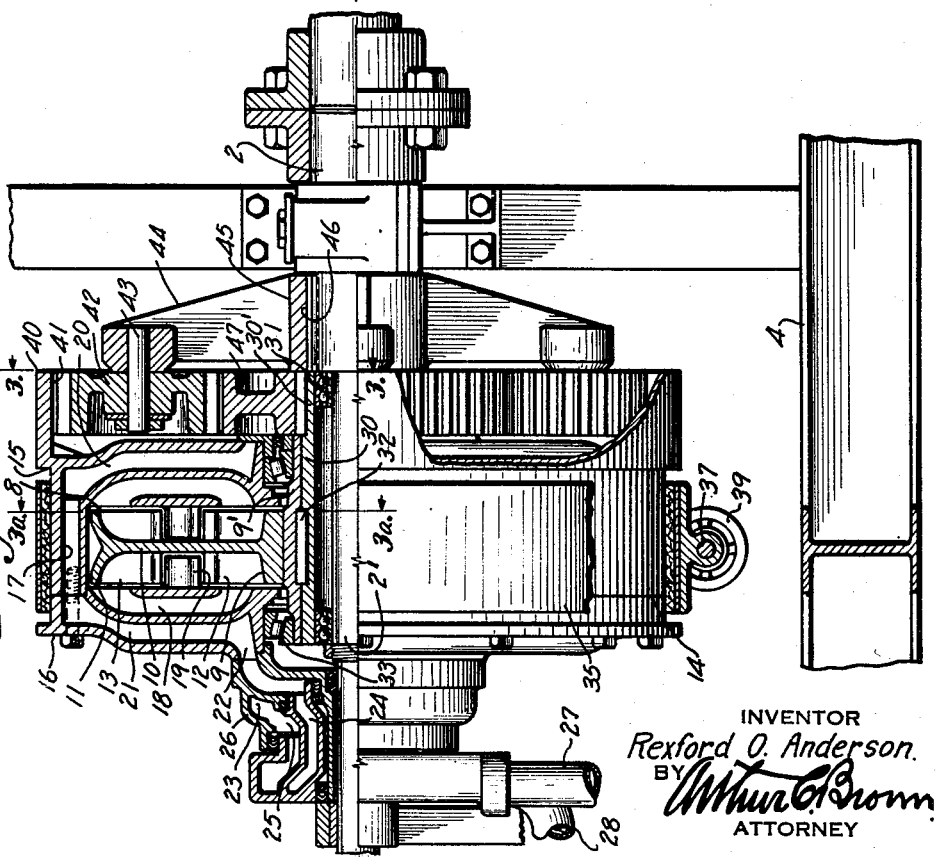
INVENTOR
Rexford O. Anderson.
BY
ATTORNEY

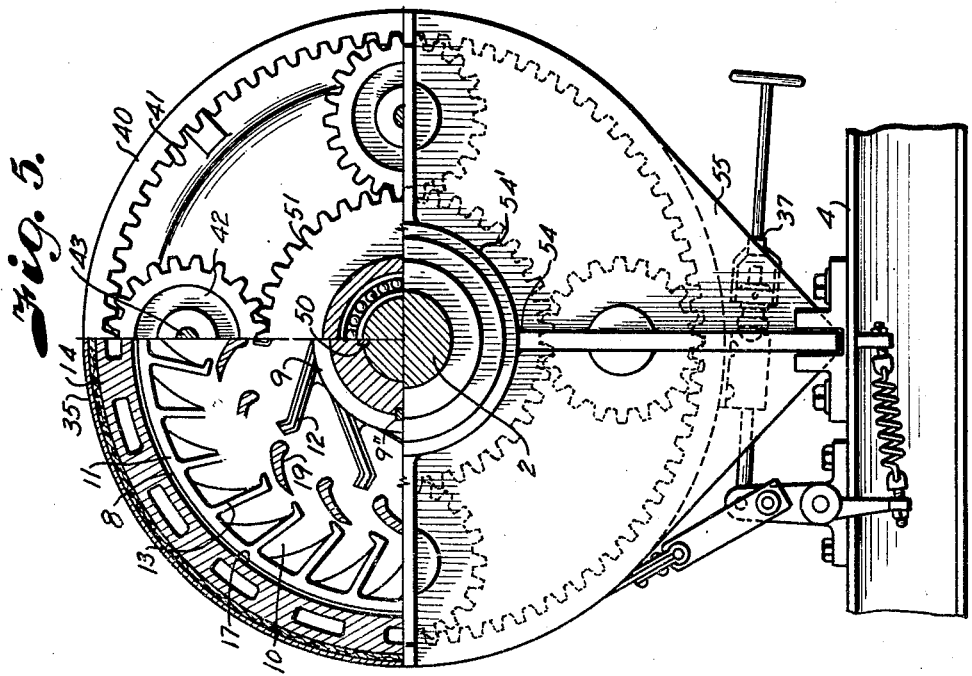

Oct. 22, 1940.                R. O. ANDERSON                2,219,215
                        HYDRAULIC BRAKING APPARATUS
                    Filed April 11, 1938        7 Sheets-Sheet 4
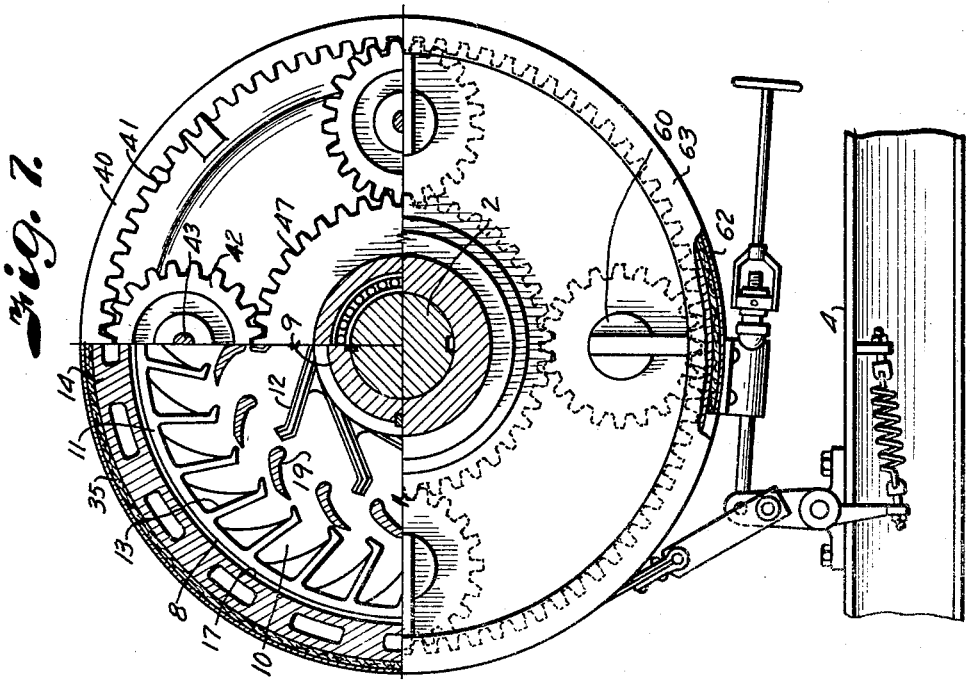
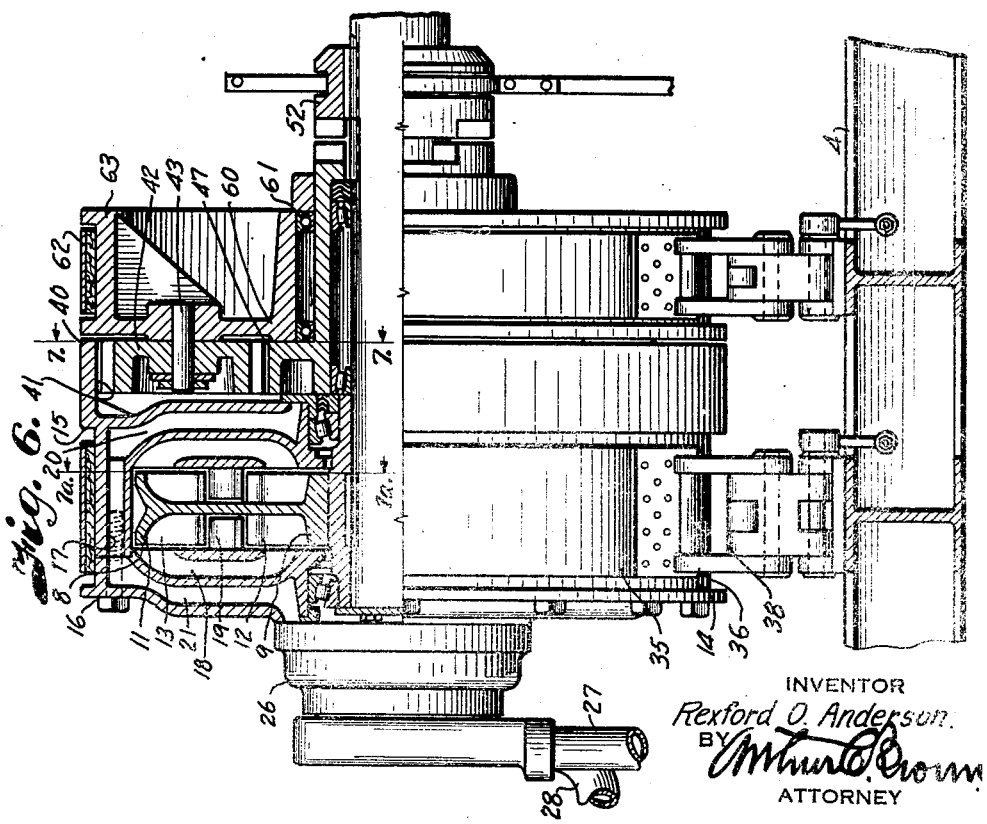
INVENTOR
Rexford O. Anderson.
BY
ATTORNEY Oct. 22, 1940.　　　　R. O. ANDERSON　　　　2,219,215
HYDRAULIC BRAKING APPARATUS
Filed April 11, 1938　　　　7 Sheets-Sheet 5
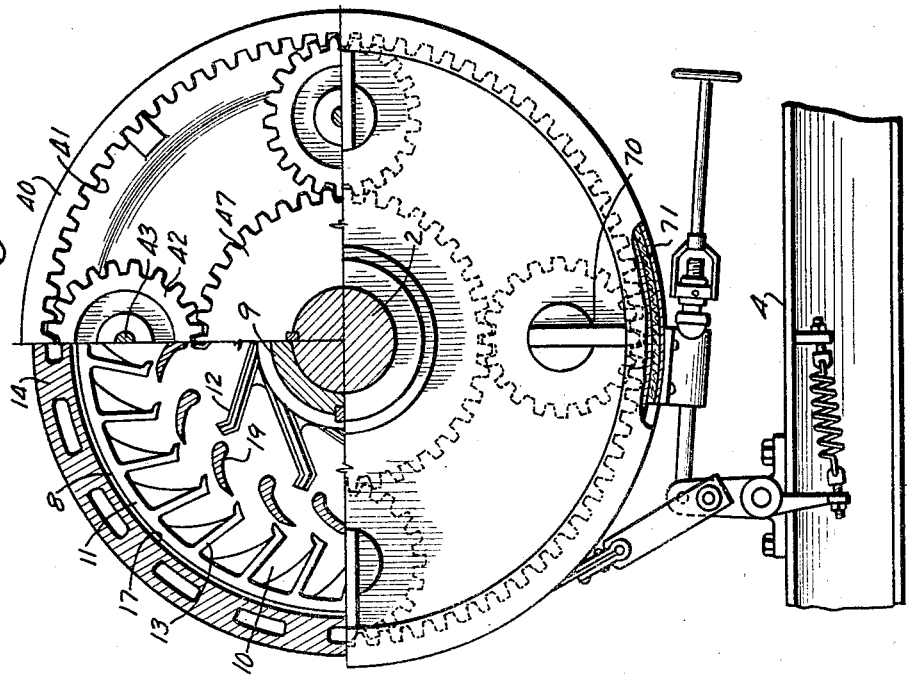
INVENTOR
Rexford O. Anderson.
BY
ATTORNEY

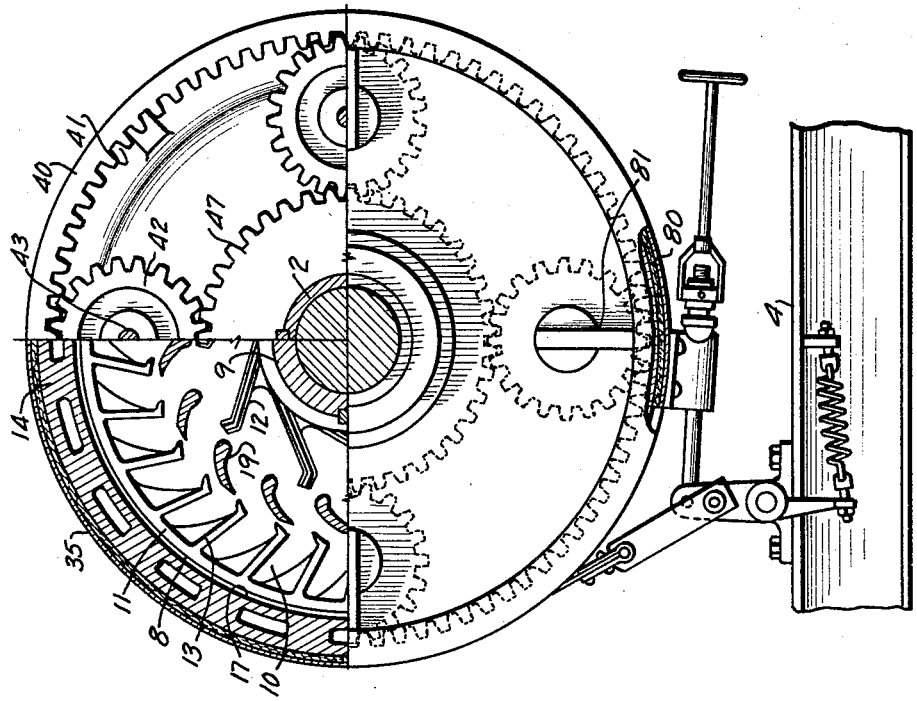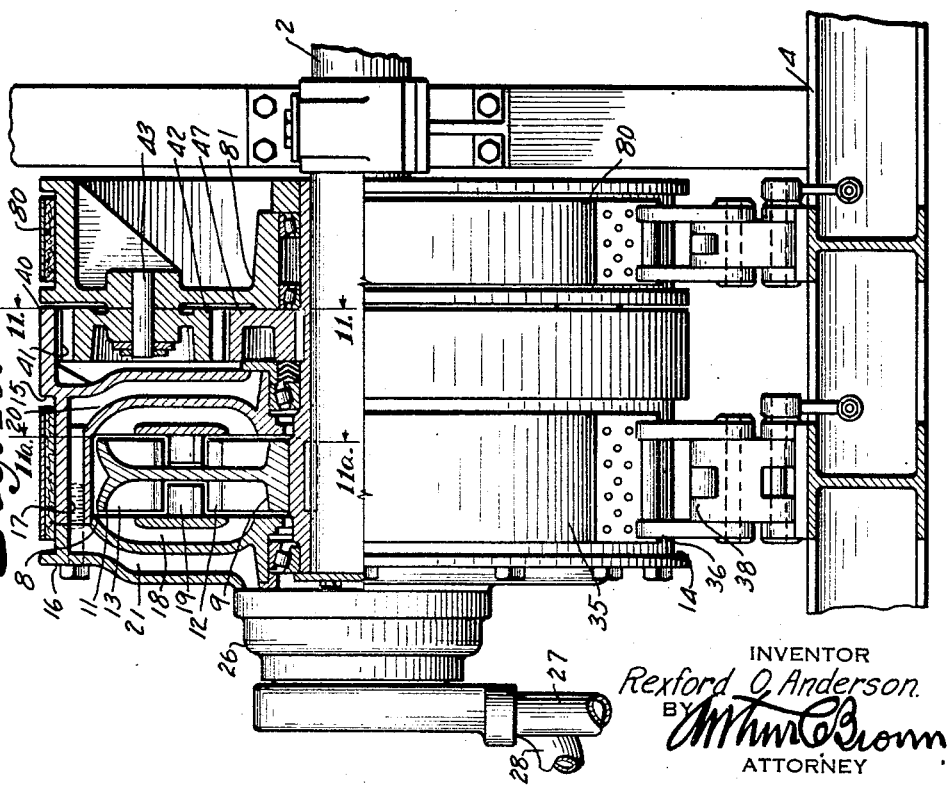

Oct. 22, 1940.  R. O. ANDERSON  2,219,215
HYDRAULIC BRAKING APPARATUS
Filed April 11, 1938  7 Sheets-Sheet 7
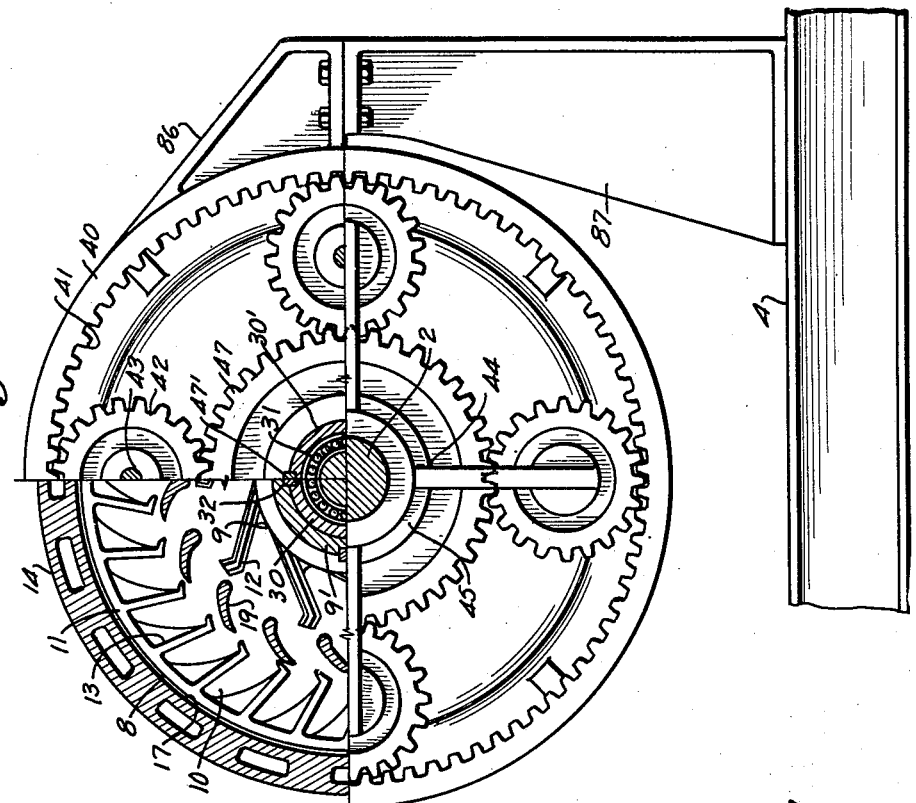
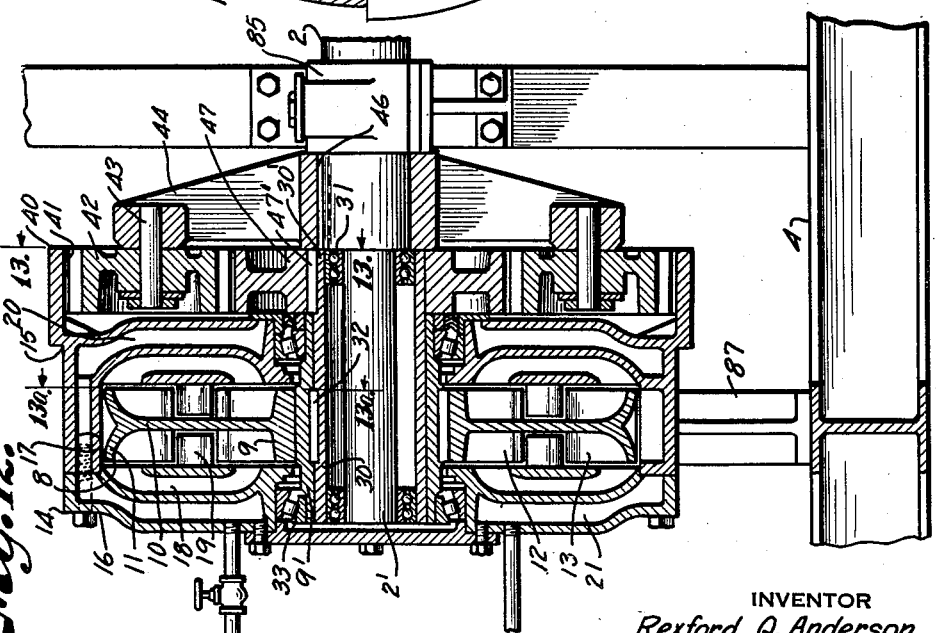
INVENTOR
Rexford O. Anderson.
BY
ATTORNEY Patented Oct. 22, 1940

2,219,215

UNITED STATES PATENT OFFICE 2,219,215

HYDRAULIC BRAKING APPARATUS

Rexford O. Anderson, Oklahoma City, Okla., assignor of one-half to Amon H. Carson, Oklahoma City, Okla.

Application April 11, 1938, Serial No. 201,321

21 Claims. (Cl. 188—90)

This invention relates to hydraulic brakes of the fluid friction type disclosed in United States Letters Patent No. 2,021,880, issued to me and Amon H. Carson on November 26, 1935, and more particularly in our pending application Serial No. 80,092 which issued as Patent No. 2,185,491 on Jan. 2, 1940, and has for its principal object to extend the present range of influences of a brake of this character by adapting it for dissipation of energy within the wide extremes of weight and speed incident to various services for which such brakes are used, without material increase in cost, weight or volume of the brake.

For example, brakes for controlling power units used in servicing of oil wells, must be capable of dissipating energy developed at the various speeds at which sucker rods, bailers, tubing and bottom hole pumping equipment are lowered into the well, or, as when lowering heavy drill pipe from draw works, or reducing as well as controlling descending speed of the load as the load increases, to insure safe setting of the drill at the bottom of the hole.

Like advantage may be derived from use of my improvements in connection with use of brakes of this character with other specific mechanisms, such as motor trucks, elevators, or in other equipment requiring regulation or control of loads or forces under variable conditions of speed or weight.

More particularly my improvements relate to a brake of fluid friction type wherein relative speed of the prime mover, the impeller and the resistor elements may be varied from zero to a higher multiple of the speed of the prime mover than is possible with known brakes of this type.

In accomplishing these stated and other objects of my invention I have provided improved details of structure, preferred forms of which are illustrated in the accompanying drawings, wherein:

Fig. 2 is a side elevation, partly in central, vertical section and partly broken away, of a form of the invention in which selective amplification of braking power may be effected by increase of speed of the impeller element of the brake over that of the power shaft.

Fig. 3 is a section on the line 3—3, Fig. 2, partly in further section on the line 3a—3a, Fig. 2.

Fig. 4 is a side elevation partly in central, vertical section, of a form of brake wherein selective amplification of braking power may be effected by rotation of the impeller shell oppositely to the impeller.

Fig. 5 is a sectional view on the line 5—5, Fig. 4, and partly in further section on the line 5a—5a, Fig. 4.

Fig. 6 is a side elevation, partly in vertical section, and partly broken away, of a form of the invention similar to that illustrated in Figs. 4 and 5, but adapted for closer regulation of the brake power.

Fig. 7 is a side view, the lower part being in elevation and the upper part in sections on the lines 7—7, and 7a—7a, Fig. 6.

Fig. 8 is a side elevation, partly in central, vertical section, of a form of brake wherein braking power may be applied selectively from zero to maximum capacity of the brake.

Fig. 9 is a sectional view on the line 9—9, and in further section on the line 9a—9a, Fig. 8, and partly broken away to disclose the planetary gearing.

Fig. 10 is a side elevation, partly in central, vertical section of a form of brake similar to that illustrated in Figs. 8 and 9 except for independent regulation of rotation of the resistor.

Fig. 11 is a sectional view on the line 11—11, Fig. 10, and further on the line 11a—11a, Fig. 10.

Fig. 12 is a central vertical section of a form of brake having a stationary shell.

Fig. 13 is a sectional view on the line 13—13, Fig. 12, and further on the line 13a—13a, Fig. 12.

Figure 1:
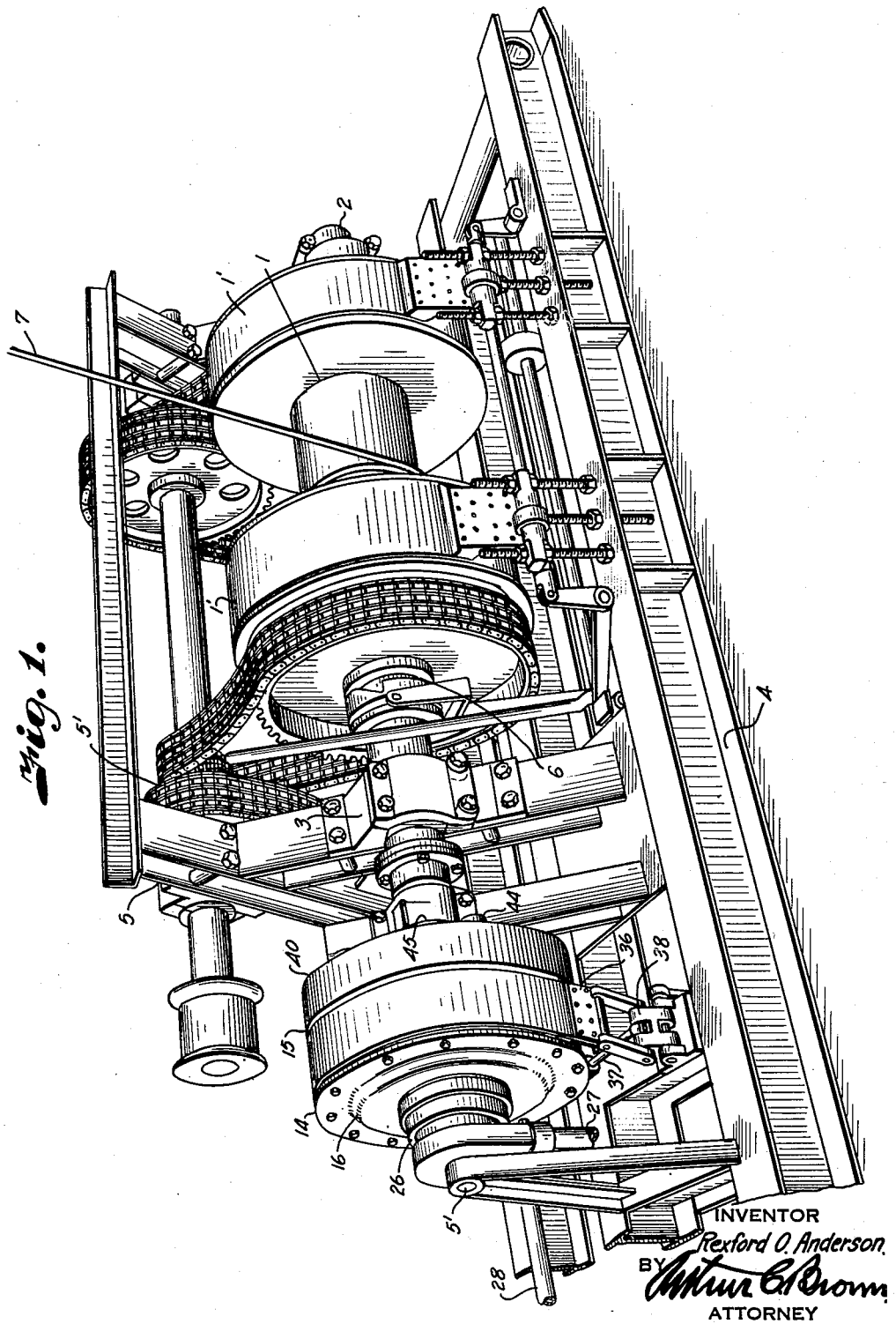
Fig. 1 is a perspective view of well drilling equipment illustrating application of a brake embodying one form of the invention to a drum shaft.

In describing the invention by reference to the drawings, it will be assumed that the brake is used in connection with a drum for letting in and pulling tools, a bailer, tubing or casing in standard drilling, or with draw works employed for rotary drilling of oil wells. For such purpose the drum 1, Fig. 1, is mounted on a shaft 2 supported in bearings 3 on a frame 4 of a conventional draw works 5. The drum is operable through a clutch mechanism 6 from a driving mechanism 5' connected to a prime mover, and carries a cable 7 run over a pulley carried in a suitable derrick (not shown), as in ordinary practice. The drum 1 also has conventional brake bands 1' normally used for controlling the speed of descent of tools or the like being run into the well.

In all forms of the invention I prefer to employ a brake proper of the construction disclosed in my copending application Serial No. 80,092, including an impeller 8, Fig. 2, comprising a hub 9 mounted on the drum shaft 2, a web 10 having laterally and oppositely flared rim flanges 11 forming chambers at opposite sides of the web, impeller blades 12 extending from the web in a direction to force fluid through said chambers, and baffles 13 extending inwardly from the rim flanges 11 at angles opposite to those of the impeller blades 12.

The brake shell 14 may consist of a body 15 and cover 16, both rotatable about the shaft at opposite sides of the impeller and one of which includes a rim 17 cooperative with the other member of the shell to enclose the impeller in such spaced lateral relation as to form radial channels 18 providing communication between the lateral outlets from the impeller blades 12 for return of braking fluid back to the chambers formed between the blades 12.

Deflectors 19 on the shell body and cover are interposed between the impeller blades 12 and baffles 13 on the impeller to promote dissipation of energy imparted to the brake fluid by the impeller blades through change of direction of the fluid during its travel within the impeller, the shell body and cover being provided with passageways 20 and 21 for supply of fluid to and exhaust of fluid from the channels 18 through ports 22 and 23 to permit continuous circulation of the fluid within the shell and for incidental cooling purposes. Supply and exhaust of the fluid to and from the shell is effected through respective passageways 24 and 25 in a header 26 communicating with the source of fluid supply through a line 27 and with waste through a line 28.

I have described only as much of the brake mechanism as is necessary to disclose an operative structure, as reference to my copending application may be had for more complete disclosure of its particular construction.

In hydraulic brakes of this character in which the impeller is fixed to the power shaft and the resistor anchored relative to the impeller and shaft to constitute it a stator, braking effect results from dissipation of energy imparted to fluid in the brake from the drive shaft by friction of the fluid on the relatively movable parts. A balance between the energy generated by the descending load and resistance to such energy represented by friction of the fluid on the relatively movable parts results in holding rotation of the shaft and drum and resultant lowering of the load in the well hole at a constant speed coordinate with the area of the surface over which the fluid travels within the brake under the conditions stated; slowing down of the load as it approaches its terminal being effected by manual application of a brake band to its drum in accordance with ordinary practice. Dissipation of energy with the form of brake in which the shell may turn with the impeller under control of a brake band on the rim of the shell, as disclosed in my copending application and illustrated in Figs. 2 to 7, inclusive, 10 and 11 of the present application, is effected generally as described above, but the application differs from that employed with the stator type brake, in that differential in braking effect may be selectively attained between the zero point, as when the shell is permitted to turn at the same speed as the impeller, and the maximum, as when the shell is held stationary by its hand brake.

If, however, the loads are heavy, or the depths to which the loads must travel are extreme, more energy is developed in response to the greater weight and increased momentum incident to such conditions than can be dissipated safely with the brakes of former construction of equal fluid capacity, and it is to provide an effective brake for such conditions, without increasing size or internal fluid capacity of the unit that my present improvements have been devised.

In the form of the invention illustrated in Figs. 2 and 3, the impeller and resistor elements are both rotatable about the shaft and each rotatable relative to the other under control of a friction brake and actuation of planetary gearing presently described, the hub 9 of the impeller 8 being keyed to a sleeve 30 turning on ball bearings 31 set on a reduced portion 2' of the shaft 2 by a spline 32 to provide for rotation of the impeller on the shaft, and the shell 14 being mounted on roller bearings 33 carried by extensions 9' on the impeller hub 9 to provide for rotation of the shell about the impeller. The hub of the propeller 9 may for all practical purposes be of one part but for convenience of machining the hub is formed of two elements secured together by a key 9'' (Fig. 3). Surrounding the rim 17 of the shell 14 is a brake band 35 of conventional form, having one end 36 anchored to the derrick floor, or other support, and its opposite end connected with a screw 37 attached to the anchor lever 38 for the fixed end of the band and operable by hand wheel mechanism 39 in accordance with ordinary practice.

Extending laterally from the rim of the shell is a flange 40, having an internal ring gear 41 meshing with a series of planet gears 42 rotatably mounted on stub shafts 43 carried by the arms 44 of a spider 45 keyed to the shaft 2 by a spline 46. The planet wheels 42 also mesh with a sun gear 47 keyed on an extension 30' of the sleeve 30, which carries the impeller. With such arrangement, when the shell is free and with the shaft rotated in a clockwise direction (Fig. 3), the planet gear wheels serve as a clutch to effect rotation of the impeller and shell in the same direction and at the same speed as the shaft. However, if the brake band be tightened on the rim of the shell to hold the shell stationary, then planetation of the wheels 42 about the sun gear will rotate the sun gear in a clockwise direction, and the impeller, being fixed to the sun gear, will rotate clockwise at a speed increased over that of the drive shaft in direct proportion to the pitch diameter of the ring gear to the sun gear, thus increasing the speed differential between the impeller and the shell, with resultant increase in dissipation of energy over that which could be effected with the impeller connected directly to the drive shaft, as in common practice with brakes of this type. For example, assuming the pitch diameter of the ring gear to be forty inches and that of the sun gear twenty inches, and the drive shaft rotating at 300 R. P. M., the impeller would turn at a speed of 300×40/20 or 600 R. P. M. With the energy incident to the descending load varying directly in proportion to the square of the differential speed, then the energy dissipated by the brake would be $600^2/300^2$, or four times that which would be dissipated by the same brake with the impeller fixed to the shaft. It is apparent that any differential of speed of the impeller and its shell between zero, as when the shell turns at the same speed as the impeller, and maximum, as when the shell is held stationary, may be secured, thus providing complete flexibility of control of the descending load within such range, and thereby making it possible to maintain a balance between the braking power and descending load for various increase in weight of the load due to variation in length of the letting in line during descent of the load, and permitting the operator to slow down the letting in speed as the load approaches its destination.

In the form of the invention illustrated in Figs. 4 and 5, the inner sleeve portion of the hub, which is secured to the impeller proper by the key 9" (Fig. 5), is directly mounted on the shaft and keyed thereto by a spline 50, and the shell rotatable about the impeller under control of the friction brake, as with the form of device disclosed in my copending application, thus providing for differential dissipation of energy from zero, as when the shell is turning with the impeller, to maximum when the shell is held stationary by the friction brake. With this form of the invention, however, the central gear 51 is rotatable on the shaft but adapted for rotation therewith through a clutch 52 of conventional design. Also with this form of the invention the gear 51 rotates on ball bearings 53 within the hub 54' of the spider 54, which in this case is anchored to the derrick floor, or other support, by an extension 55 and bolts or other fastening devices. With the clutch 52 out, dissipation of energy is limited to that represented by differential in rotation between the impeller and shell, as with the device of my copending application. When the center gear 51 is clutched to the shaft by means of the clutch 52, the central gear rotates the gears 42 on stationary axes, for the reason that the spider is anchored. Therefore, the gears 42 drive the shell in anti-clockwise direction and reversely to the rotation of the shaft and impeller at a speed in ratio to the pitch diameter of the gear 51 divided by the pitch diameter of the ring gear. For example, assuming the pitch diameter of the central gear to be 20 inches and that of the ring gear 40 inches, and the shaft speed 300 R. P. M., the shell will be rotated counter-clockwise at a speed of 300×20/40, or 150 R. P. M., and the differential between the speed of the impeller and that of the shell consequently 300 plus 150, or 450 R. P. M.

Thus, in case the energy dissipated by the hydraulic brake is directly proportional to the square of the differential speed and assuming that it dissipates 300 H. P. at 300 R. P. M., the energy dissipated would be $300 \times 450^2/300^2$, which equals 675 H. P. The torque reaction of the shell through the ring gear would then be $$675 \times 33{,}000/450 \times 40 \times \pi/12.$$

This equals 4,714 pounds, which equals a torque of 4,714×20/12 or 7,850 pounds feet, which reacts on the rotor 8. The torque of 4,714 pounds on the P. D. of the ring gear is transmitted by the gears 42 to the P. D. of the gear 51, thus administering the torque of 4,714×10/12, or 3,930 pounds feet to the central gear and thus to the shaft 2, making a total of 7,850 plus 3,930, or 11,780 pounds feet. With the same hydraulic brake directly connected to the drive shaft with a maximum differential speed of 300 R. P. M. and energy dissipation of 300 H. P., the torque reaction on the shaft would equal $$(300 \times 33{,}000/300 \times 40\pi/12) \times (20/12)$$

or 5,250 pounds feet, thus causing the brake to dissipate 44.6% of the energy dissipated by a hydraulic brake of the same rating connected as described in this modified form of my invention.

This form of the invention affords two distinctive stages in the capacity of the unit; one stage being with the clutch 52 disengaged and band 35 is engaged, allowing complete flexibility in capacity with constant shaft speed of from zero to the maximum obtainable with a differential speed equal to the speed of the shaft 2. This flexibility is effected by adjustment of the screw 37. The other stage occurs when the clutch 52 is engaged and brake band 35 is released, thus affording a non-flexible dissipation of energy for constant drive shaft speed.

The form of the invention disclosed in Figs. 6 and 7 corresponds with that of Figs. 4 and 5, in that here the impeller is keyed to the shaft, the shell rotatable about the impeller under control of its friction brake, and the sun gear adapted for clutch engagement with the shaft. However, in this form of the invention the spider 60 instead of being anchored to the derrick floor or other support, is rotatable about the extended hub of the sun gear on ball bearings 61 under control of a friction brake consisting of a band 62 surrounding a brake flange 63 at the periphery of the spider and mounted and equipped for operation as disclosed in connection with the form in which the friction brake is on the shell. It is apparent that with this form of the invention when the spider is held stationary by its brake band the operation will be as with the form shown in Figs. 4 and 5, but when the band is released and the spider free to rotate, the gears 42 will planetate about the sun gear, thus reducing the speed of rotation of the shell relative to that of the shaft, in this way providing a finer adjustment of dissipation of energy in the brake.

The form of the invention illustrated in Figs. 8 and 9 is adapted for securing substantially the same result as the form illustrated in Figs. 2 and 3, or that of my copending application, but by a different combination of elements, in that with this form the impeller and sun gear are attached to the shaft to rotate therewith and the shell is rotatable about the impeller to effect variation in energy dissipation through movement of the shell reversely to that of the impeller. Here, however, regulation of movement of the shell is effected through the spider of the planetary gearing. With the spider 70 made stationary by its friction brake 71 and the shaft turning, rotation of the sun gear with the shaft drives the shell counter-clockwise, thus increasing resistance in the brake, and with consequent increase in energy dissipation. Controlled rotation of the spider by the operation of its friction brake, permits a variation in the relative speed between the shell and impeller of from zero, as when the spider is entirely free and the planet gears serve merely to clutch the shell to the shaft so that it turns therewith, to a maximum relative speed equal to the $$\text{impeller speed} \times \frac{(1 + \text{sun gear P. D.})}{\text{ring gear P. D.}}$$

as when the spider is locked stationary and the sun gear operates through the planet gears to rotate the shell in a direction opposite to that of the impeller.

The form of the invention disclosed in Figs. 10 and 11 corresponds substantially to that of Figs. 8 and 9, in that the impeller and sun gear are keyed to the shaft and the shell and planet gear rotatable thereon. In this form, however, the shell is equipped with a friction brake of the type heretofore described, so that the shell and spider may have independent regulation by their respective friction brakes to afford two distinct stages of operation. Complete release of the brake band 35 and adjustment of the brake band 80 affords a single stage unit which will afford flexible dissipation of energy varying from zero to the maximum of the unit similar to that form of the invention described in Fig. 8 and Fig. 9. Adjustment of the brake band 35 affords a stage wherein the dissipation of energy varies from zero up to the capacity of the hydraulic brake at a differential speed equal to the speed of the drive shaft 2. The gearing operates during this stage without load. The second stage of operation takes place with the adjustment of the brake band 80. The application of this brake band gradually takes the load off the brake band 35, transferring the reactive torque from the shell 14, through the ring gear 41, the planet gears 42, to the sun gear 47 and to the shaft 2. This added torque to the shaft acts to increase the dissipation of energy without change in the differential speed between the impeller and the shell. Further adjustment of the brake band 80 acts to stop rotation of the spider 81 causing rotation of the shell 14, in a counter-clockwise direction in proportion to the ratio of the ring gear 41 and the sun gear 47. The differential speed between the impeller and the shell is thus increased to equal the sum of the speed of the drive shaft and the shell. This affords a dissipation of energy in proportion to the differential speed which is in excess of that of a hydraulic brake of similar capacity directly connected to and limited in differential speed to the speed of the drive shaft.

Fig. 12 and Fig. 13 disclose another form of the invention in which the differential speed of the shell and impeller is increased over that of the shell and drive shaft by amplifying the speed of the impeller over that of the drive shaft, similar to that form shown in Figs. 2 and 3. Figs. 11 and 12 disclose the combination of the stator type of hydraulic brake, now known to the art, and the speed transmission equipment.

In this form the shell 14 and the sun gear 47 are mounted upon the impeller hub 9', the shell 14 being rotatively mounted on the bearing 33 and the sun gear 49 being fixed to the sleeve extension 30 by key 47'. The impeller hub is rotatably mounted in bearings on the shaft 2. The planet gear spider is keyed to the shaft 2. The shaft 2 is rotatably mounted in bearings 85 in the shaft supporting post and connected to a prime mover, or a load handling member (not shown). The shell 14 is held stationary by the arm 86 on a pedestal 87.

In the operation of this form of the invention the drive shaft 2 and spider 44 are driven in a clockwise direction. The shell with the ring gear 41 remain stationary and thus cause the planet gears 42 to rotate anti-clockwise and drive the sun gear 47 and impeller in a clockwise direction at a speed relative to that of the drive shaft in direct proportion to the pitch diameter of the ring gear to that of the sun gear. This increases the differential speed between the impeller and the shell, thus increasing the energy dissipated by the brake over that which would be dissipated should the impeller be directly connected to the drive shaft, as is the conventional form of hook-up.

It is apparent that by employment of the various instrumentalities herein disclosed for accelerating speed of one of the brake elements relative to the other, I am able not only to materially increase capacity of the brake without substantial increase in its size, weight, or cost, but to secure additional flexibility in regulation of energy dissipation, affording increased safety as well as convenience in operation of a brake of this character in connection with heavy loads.

While I have described my invention in its application to a particular use, this has been merely for clarity of disclosure without intent to limit range of use of the invention. Other and various uses of the brake will readily suggest themselves to those skilled in the art.

What I claim and desire to secure by Letters Patent is:

1. A hydraulic brake including relatively movable impeller and enveloping resistor members mounted upon a common driving draft, and planetary gearing interposed between said members for accelerating relative movement of said members in excess of the speed of the said driving shaft.

2. A hydraulic brake including rotatable impeller and resistor members, means for accelerating relative movement of said members, and separate means for retarding movement of one of said members.

3. A hydraulic brake including rotatable impeller and resistor members, means for accelerating relative movement of said members, and separate means for selectively retarding movement of said resistor member.

4. In combination with a shaft rotatable in response to a force to be controlled, an impeller rotatable with the shaft, an enveloping resistor rotatable about said shaft, and means operable in conjunction with the shaft for accelerating relative rotation of the impeller and the resistor.

5. In combination with a rotatable shaft, an impeller and a resistor on the shaft and adapted for independent relative rotation, and means operable in conjunction with the shaft for accelerating said relative rotation.

6. In combination with a rotatable shaft, an impeller and a resistor on the shaft and adapted for independent relative rotation, means operable in conjunction with the shaft for accelerating said relative rotation, and means for regulating rotation of the resistor.

7. In combination with a rotatable shaft, an impeller and a resistor on the shaft and independently rotatable relative to each other, ring and sun gears fixed one to the impeller and the other to the resistor, internal gears connecting the ring and sun gears, and mounting for the internal gears rotatable by the shaft.

8. In combination with a rotatable shaft, an impeller and a resistor on the shaft and independently rotatable relative to each other, ring and sun gears fixed one to the impeller and the other to the resistor, internal gears connecting the ring and sun gears, mounting for the internal gears rotatable by the shaft, and means for regulating rotation of the resistor.

9. In combination with a rotatable shaft, an impeller fixed on the shaft, an enveloping resistor rotatable relative to the impeller and shaft, and means operable in conjunction with the shaft for effecting rotation of the resistor oppositely to rotation of the impeller and shaft.

10. In combination with a rotatable shaft, an impeller fixed on the shaft, a resistor rotatable relative to the impeller and shaft, and means selectively operable in conjunction with the shaft for effecting rotation of the resistor oppositely to rotation of the impeller and shaft.

11. In combination with a rotatable shaft, an impeller fixed on the shaft, a resistor rotatable relative to the impeller and shaft, a gear on the shaft, a ring gear on the resistor, and connecting gears arranged for stationary support and engaging the shaft and ring gears to rotate the resistor oppositely to rotation of the impeller.

12. In combination with a rotatable shaft, an impeller fixed on the shaft, a resistor rotatable relative to the impeller and shaft, a gear on the shaft, a ring gear on the resistor, connecting gears arranged for stationary support and engaging the shaft and ring gears to rotate the resistor oppositely to rotation of the impeller, and means for regulating rotation of the resistor relative to the impeller.

13. In combination with a rotatable shaft, an impeller fixed to the shaft, a resistor rotatable relative to the impeller and provided with a ring gear, a sun gear rotatable with the impeller, a spider rotatable relative to the shaft, the impeller, the resistor and the sun gear, planet wheels on the spider meshing with the ring and sun gears, and means for regulating rotation of the spider.

14. In combination with a rotatable shaft, an impeller fixed to the shaft, a resistor rotatable relative to the impeller and provided with a ring gear, a sun gear rotatable with the impeller, a spider rotatable relative to the shaft, the impeller, the resistor and the sun gear, planet wheels on the spider meshing with the ring and sun gears, and independent means for regulating rotation of the resistor and the spider.

15. In combination with a rotatable shaft, an impeller fixed to the shaft, a resistor rotatable relative to the impeller and provided with a ring gear, a sun gear rotatable with the impeller, a spider rotatable relative to the shaft, the impeller, the resistor and the sun gear, planet wheels on the spider meshing with the ring and sun gears, and brake bands on the resistor and spider for independently regulating rotation thereof.

16. A hydraulic brake including rotatable impeller and resistor members, speed changing power transmission means capable of accelerating movement of said resistor member relative to the impeller member in excess of the impeller speed, and clutch means for acting on one of said members to render said accelerating means effective.

17. A hydraulic brake including rotatable impeller and resistor members, gearing interposed between said members for accelerating movement of one of said members relative to the other, and clutch means for selectively rendering said gearing effective in producing said acceleration.

18. In combination with a shaft rotatable in response to a force to be controlled, an impeller rotatable by the shaft, a sun gear rotatable by the shaft, a resistor including a ring gear, and internal gear wheels connecting the ring and sun gears and movable relatively with the impeller to accelerate relative rotation of the impeller and the resistor.

19. In combination with a rotatable shaft, an impeller fixed on the shaft, a resistor rotatable relative to the impeller and shaft, a gear on the shaft, a ring gear on the resistor, connecting gears adapted for stationary support and engaging the shaft and ring gears to rotate the resistor oppositely to rotation of the impeller, means for regulating rotation of the resistor relative to the impeller, and clutch members on the shaft gear and shaft engageable to effect rotation of the shaft gear with the shaft and rotation of the resistor in a direction opposite to that of the shaft and the impeller.

20. In combination with a load handling device, a hydraulic brake including relatively movable impeller and enveloping resistor members mounted upon a common driving shaft, and planetary gearing interposed between said members for accelerating relative movement of said members in excess of the speed of said driving shaft.

21. In combination with a load handling device including a shaft rotatable in response to a force to be controlled, an impeller rotatable by the shaft, a sun gear rotatable by the shaft, a resistor including a ring gear, and internal gear wheels connecting the ring and sun gears and movable relatively with the impeller to accelerate relative rotation of the impeller and the resistor.

REXFORD O. ANDERSON.